(12) United States Patent
Pryor et al.

(10) Patent No.: US 10,462,395 B2
(45) Date of Patent: Oct. 29, 2019

(54) DETECTOR ARCHITECTURE USING OFFSET PACKETS

(71) Applicant: Varex Imaging Corporation, Salt Lake City, UT (US)

(72) Inventors: Paul Pryor, San Jose, CA (US); Pieter G. Roos, San Jose, CA (US); Ivan P. Mollov, San Jose, CA (US)

(73) Assignee: Varex Imaging Corporation, Salt Lake City, UT (US)

( * ) Notice: Subject to any disclaimer, the term of this patent is extended or adjusted under 35 U.S.C. 154(b) by 0 days.

(21) Appl. No.: 15/876,070

(22) Filed: Jan. 19, 2018

(65) Prior Publication Data

US 2019/0230301 A1 Jul. 25, 2019

(51) Int. Cl.
*H04N 5/357* (2011.01)
*H04N 5/32* (2006.01)
*H04N 5/363* (2011.01)

(52) U.S. Cl.
CPC ............ *H04N 5/3575* (2013.01); *H04N 5/32* (2013.01); *H04N 5/363* (2013.01)

(58) Field of Classification Search
CPC ......... H04N 5/3575; H04N 5/363; H04N 5/32
See application file for complete search history.

(56) References Cited

U.S. PATENT DOCUMENTS

| | | | |
|---|---|---|---|
| 6,140,952 A | 10/2000 | Gaboury | |
| 9,246,503 B1 | 1/2016 | Hamilton | |
| 2003/0227018 A1 | 12/2003 | Fox | |
| 2007/0046797 A1* | 3/2007 | Kakumoto | H04N 5/335 348/294 |
| 2008/0049129 A1 | 2/2008 | Meacham | |
| 2010/0026838 A1 | 2/2010 | Belenky | |
| 2010/0194956 A1* | 8/2010 | Yuan | H04N 5/35527 348/308 |
| 2015/0350584 A1* | 12/2015 | Fenigstein | H04N 5/355 250/208.1 |
| 2016/0182017 A1 | 6/2016 | Sharma | |
| 2017/0366766 A1* | 12/2017 | Geurts | H04N 5/3532 |

* cited by examiner

*Primary Examiner* — Mekonnen D Dagnew
(74) *Attorney, Agent, or Firm* — Laurence & Phillips IP Law

(57) ABSTRACT

Some embodiments include a method, comprising: integrating an input signal using an integrator to generate an integrated signal; comparing the integrated signal to a threshold; and injecting an offset signal into the integrator in response to comparing the integrated signal to the threshold such that the integrated signal passes the threshold.

20 Claims, 7 Drawing Sheets

DETECTOR ARCHITECTURE USING OFFSET PACKETS

BACKGROUND

This disclosure relates to detector architectures using offset packets.

Digital flat panel detectors may have an array of photodetectors. The photodetectors are typically read using a double sampling method. Double correlated sampling requires two samples, a signal sample and zero sample. The zero sample captures noise and offsets created by resetting the preamplifier and surrounding electronics. The signal sample contains all the noise and offsets from the zero sample and the signal of interest. By subtracting these two samples, fixed pattern noise may be eliminated, leaving the desired signal. Because of the zero sample, this process requires two sample periods for each sampled signal.

DETAILED DESCRIPTION

In some embodiments, a detector, such as a digital flat panel detector, includes readout circuits to readout signals from sensors. The readout circuits use offset signals that reduce noise and decrease readout time. As will be described in further detail below, in some embodiments, the zero sample and resetting of an amplifier in a detector may be reduced if not eliminated. Eliminating the zero sample and reset sample reduces the time to read a sensor. Furthermore, in some embodiments, a reset pulse may introduce random noise called kTC noise (or thermal noise, Johnson noise, or Nyquist noise on capacitors). Since reset pulses may be reduced or eliminated, kTC noise from resetting an amplifier is reduced or eliminated. In addition, in some embodiments, fixed pattern noise from an analog to digital converter (ADC) may be reduced.

Figure 1:
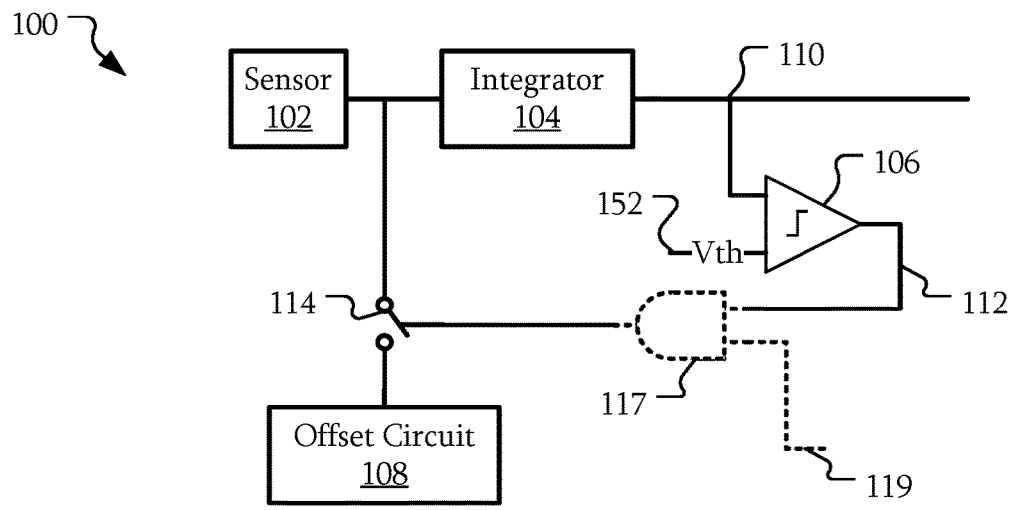
FIG. 1 is a block diagram of a detector using offset signals according to some embodiments.

FIG. 1 is a block diagram of a detector using offset signals according to some embodiments. In some embodiments, the detector 100 includes a sensor 102, an integrator 104, a comparator 106, and an offset circuit 108. The sensor 102 is a circuit that is configured to convert an incoming signal into an electrical signal. For example, the sensor 102 may include photodiodes, phototransistors, transducers, or the like. The sensor 102 may be configured to convert the incoming signal into a current, a voltage, a photon count, electrons, or the like.

The integrator 104 is a circuit configured to integrate one or more input signals into an integrated signal 110. The integrator 104 may take a form appropriate for the type of the sensor. For example, if the sensor 102 is configured to generate a voltage as an output signal, the integrator 104 may be configured as a voltage integrator. Similarly, a current integrator may be used as the integrator 104 with a sensor configured to generate a current.

The comparator 106 is a circuit configured to compare two input signals. Here, the comparator 106 is coupled to the output of the integrator 104 and configured to compare the integrated signal 110 to a threshold 152. The comparator 106 is configured to generate an output signal 112 based on the comparison. For example, if the integrated signal 110 is greater than the threshold, the comparator 106 may generate a high value; however, in other embodiments, the polarity may be different according to the particular circuit.

In some embodiments, a gating circuit 117, such as an AND, OR, XOR, or other circuit may be used to control when the offset packet is injected. Here, an AND gate is used as an example to perform a logical AND operation between the output signal 112 and an offset packet enable signal 119. Accordingly, a time between when the integrated signal 110 passes the threshold 152 and when the offset packet is injected may be controlled.

The offset circuit 108 is a circuit configured to generate an offset packet. Here, an offset packet is a signal configured to change an output of the integrator 104 in a direction opposite to that by the sensor 102. For example, if the sensor 102 is configured to generate a signal that causes the integrated signal 110 to increase, the offset packet is a signal that is configured to cause the integrated signal 110 to decrease.

The offset circuit 108 may be a circuit matched with the integrator 104. For example, if the integrator 104 is a current integrator, the offset circuit 108 may include a voltage source and a capacitor configured to transfer a particular amount of charge to/from the integrator 104. In another example, the offset circuit 108 may be a current source configured to supply a current for a predetermined amount of time. Although some examples have been given for an offset circuit 108, other circuits may be used.

The switch 114 is a circuit configured to selectively apply the offset packet from the offset circuit 108 to the integrator 104. The switch 114 may be a transistor in some embodiment; however, in other embodiments, the switch 114 may be circuit of the offset circuit 108 configured to cause the output to switch on or off. For example, the switch 114 may be a circuit of a controllable current source that selectively enables or disables the output of the current source in response to the output signal 112.

The switch 114 is configured to apply the offset packet to the same input node of the integrator 104 as the output signal from the sensor 102. However, in other embodiments, the switch 114 may be configured to apply the offset packet to another input of the integrator 104. Moreover, the connection of the offset circuit 108 to the integrator 104 through the switch 114 may define the polarity of the offset packet. For example, if the sensor 102 is connected to a non-inverting input of the integrator 104 and the switch 114 is connected to an inverting input of the integrator 104, the offset packet may have the same polarity as a signal from the sensor 102.

The threshold 152 may have a variety of values. For example, the threshold 152 may be a level such that a greatest expected input signal will not cause the integrated signal 110 to saturate when added to an integrated signal 110 that is just below the threshold 152. In other embodiments, the threshold 152 may be selected to accommodate the finite time of injecting an offset packet while still avoiding saturation of the integrator 104. In other embodiments, the threshold 152 may be selected in different ways.

Although not illustrated, the offset circuit 108 may include charging circuits to reset the offset circuit 108 after injecting an offset packet. As a result, the offset circuit 108 may be ready to inject another offset packet. In some embodiments, the offset circuit 108 may be configured to be reset within one sample period; however, in other embodiments, the time to reset the offset circuit 108 may be different.

Figure 2:
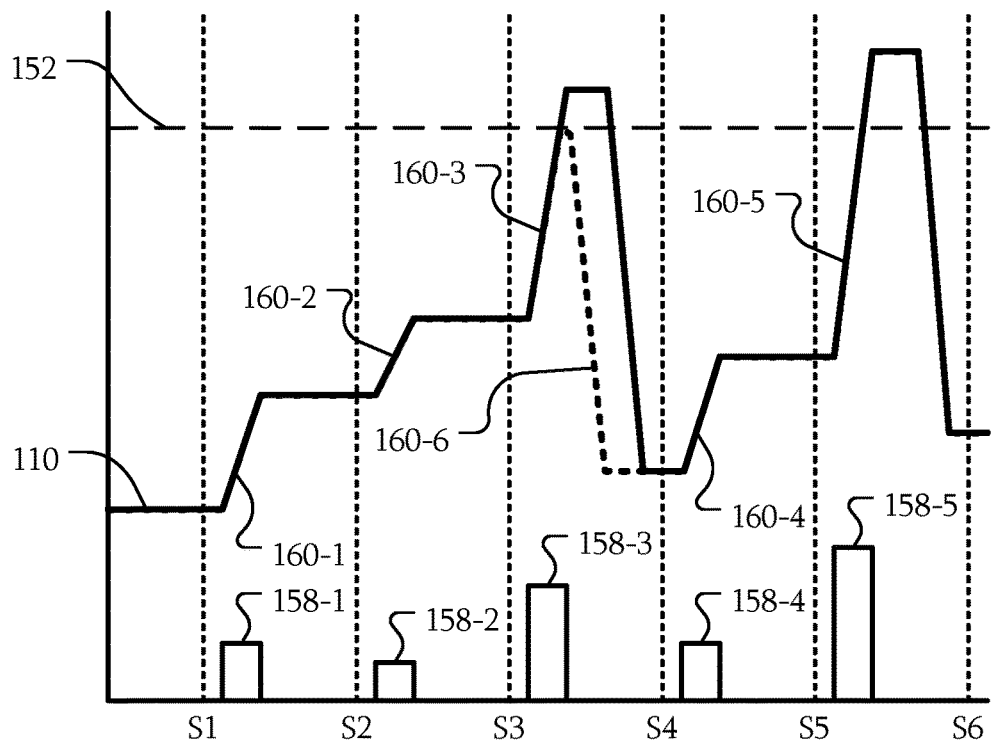
FIG. 2 is a chart illustrating inputs to and output of an integrator according to some embodiments.

FIG. 2 is a chart illustrating inputs to and output of an integrator according to some embodiments. Referring to FIGS. 1 and 2, the integrated signal 110 changes in response to various input signals 158. In this example, periodically, a signal 158 from the sensor 102 is integrated in the integrator 104. These signals 158 result in the increases 160. At various times, the integrator 104 output is sampled. Sampling points S1-S6 represent examples of the sampling times. Although the sampling time is illustrated as occurring at an instant, in some embodiments, the sampling time may be a finite amount of time.

The integrated signal 110 may be sampled at sample point S1. A first signal 158-1 from the sensor 102 causes a first increase 160-1 in the integrated signal 110. The integrated signal 110 may be sampled at sample point S2. The increase in the integrated signal 110 was due at least in part to the input signal 158-1. Accordingly, the value of the signal 158-1 may be calculated by subtracting the value at sample point S1 from the value at sample point S2. Signal 158-2 similarly causes the increase 160-2 in the integrated signal 110. The value of the input signal 158-2 may be similarly calculated by subtracting the value at sample point S2 from the value at sample point S3.

Signal 158-3 similarly causes the increase 160-3 in the integrated signal 110. However, signal 158-3 has caused the integrated signal 110 to pass the threshold 152. Accordingly, output signal 112 from the comparator 106 is activated. In response, the switch 114 is closed, injecting the offset packet from the offset circuit 108 into the integrator 104. As a result, the integrated signal 110 falls.

If the value of the input signal 158-3 was calculated by subtracting the value at sample point S3 from the value at sample point S4 similar to the previous calculations, the result would be a negative value. However, that negative value may be added with a value representing the change due to the injection of the offset packet into the integrator 104. This results in a value representative of the signal 158-3. Equation 1 below illustrates an example of the calculation of the value of a signal 158:

$$\text{Value} = S_x - S_{x-1} + OP \cdot F \qquad (1)$$

Here, $S_x$ is the value of the sample immediately after the signal 158 of interest was integrated and $S_{x-1}$ the sample immediately before the signal 158 of interest was integrated. OP is the value representing the magnitude of the change in the output of the integrated signal 110 after the offset packet was injected. F is a value of 1 or 0 where a 1 indicates that the output of the integrated signal 110 passed the threshold 152 between the last two samples and that the offset packet was injected.

This process may continue after injecting the offset packet. For example, once at a lower level, the integrated signal 110 may increase again. For example, input signal 158-4 results in rise 160-4. The value of the input signal 158-4 may similarly be calculated by subtracting the value at sample point S4 from the value at sample point S5.

Signal 158-5 causes the integrated signal 110 to pass the threshold 152 similar to the signal 158-3. Because of a difference in one or more of the signal 158 and the previous value of the integrated signal 110, the signal 158-5 caused the integrated signal 110 to rise to a value different from the value associated with signal 158-3. As a result, when the offset packet is again injected into the integrator 104 and the integrated signal 110 falls, the integrated signal 110 does not fall to the same value as it did after integrating signal 158-3. Instead, the integrated signal 110 falls by an amount defined by the offset packet. The value of the input signal 158-5 may be calculated similar to the value of the input signal 158-3, i.e., by subtracting the value at sample point S5 from the value at sample point S6 and adding a value representing the change due to the injection of the offset packet into the integrator 104.

The integrated signal 110 of FIG. 2 is an idealized example. In practice, noise will be added by components from the integrator 104 to any digitizing circuitry. Each of the digitized values of the two samples will have that noise component. By subtracting those two values, the noise may be reduced or eliminated.

Moreover, using a sampling technique described herein, noise may be reduced while overall sampling time is cut in half. For example, using a zero sample where no signal is acquired requires one sample period. Sampling the actual signal requires a second sample period. Thus, to obtain a signal with reduced noise, two sample periods are needed. However, in sampling techniques described herein, each sample acquires some signal. After an initial first sample, each subsequent sample acquires a signal while the noise is still reduced. In other words, by relying on the previous sample, only one sample is used for each new signal acquisition.

In some embodiments, the injection of the offset packet may occur at an arbitrary time. For example, the dashed line represents a technique where the offset packet is injected as soon as or shortly after the integrated signal 110 passes the threshold 152. The integrated signal 110 will still fall to the same level as the input 160-3 is still being integrated.

In normal operation, the integrated signal 110 should not reach a saturated level. For example, in some embodiments, a single signal from one sensor 102 may be insufficient to cause the integrated signal 110 to saturate. However, a defective sensor 102 may cause two or more signals to be input to the integrator 104. In another example, the integrated signal 110 should not unintentionally return to zero, or return to zero when the offset packet is injected. Accordingly, the saturated level or zero level may be used to detect if a sensor 102 is defective, if an offset circuit 108 is defective, or the like. In some embodiments, the integrated signal 110 may be monitored to determine if the integrated signal 110 is at or near the saturated level and/or at or near the zero level. If a defect is detected, a flag may be set such that the defect may be identified and further processing may be performed using the information.

Figure 3:
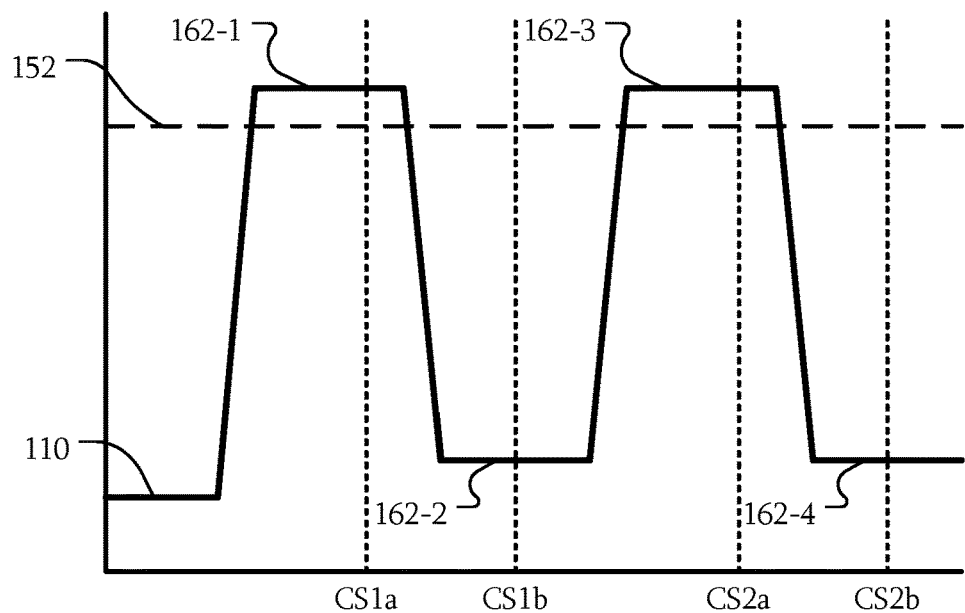
FIG. 3 is a chart illustrating an output of an integrator during calibration according to some embodiments.

FIG. 3 is a chart illustrating an output of an integrator during calibration according to some embodiments. Referring to FIGS. 1 and 3, as described above, a value representing the magnitude of the change in the output of the integrated signal 110 after the offset packet was injected is added to the difference between the current and previous sample values to correct for the injection of the offset packet.

However, the offset packet is an analog signal injected into the integrator 104 while the values of the samples are digitized in a different circuit. To determine the value representing the change in the integrated signal 110 after digitization due to the offset packet, the change in the integrated signal 110 may be measured when no signal from a sensor 102 is integrated.

Here, the integrated signal 110 is reset to a level 162-1. In some embodiments, the integrator 104 may include a self-nulling amplifier. Using a self-nulling amplifier or another type of reset circuit, the integrator 104 may be reset such that the integrated signal 110 is set to a known level 162-1 that is greater than the threshold 152. In some embodiments, a feedback capacitor of the integrator 104 may be set to a particular voltage. In other embodiments, the integrator 104 may be configured to operate with a virtual ground equal to the level 162-1. The integrator 104 may be reset to this virtual ground. In other embodiments, a calibration offset packet similar to the offset packet from the offset circuit 108 may be injected into the integrator 104. However, this calibration offset packet may have the opposite polarity to the offset packet from the offset circuit 108. As a result, the integrated signal 110 is increased when the calibration offset packet is injected into the integrator 104. In some embodiments, the injection of this offset packet may be performed until the comparator 106 indicates that the integrated signal 110 has passed the threshold 152.

This level 162-1 is sampled at sample point CS1$a$. Afterwards, the offset packet is injected, reducing the integrated signal 110 to level 162-2. The level 162-2 is sampled at sample point CS1$b$. Between the two samples CS1$a$ and CS1$b$, an input signal from a sensor 102 was not integrated into the integrated signal 110. As a result, the change in the integrated signal 110 should be equal or approximately equal to the magnitude of the offset packet. A digitized value for the change may be calculated by subtracting sample CS1$a$ from CS1$b$. In some embodiments, only a single measurement may be performed to calculate the value to be added for the offset packet.

Here, a second calibration sequence is illustrated. Again, the integrated signal 110 is reset to level 162-3. The offset packet is injected, reducing the integrated signal 110 to level 162-4. The level 162-4 is sampled at sample point CS2$b$. The offset packet may again be calculated by subtracting sample CS2$a$ from CS2$b$. In some embodiments, the level 162-3 may be the same as the level 162-1; however, in other embodiments, the level 162-3 may be different. For example, because the offset packet introduces a relative change in the integrated signal 110, the absolute value of the reset levels 161-1 or 162-3 may, but need not be the same.

In some embodiments, multiple measurements of the effects of the offset packet may be combined. For example, equations 2 and 3 represent a technique of combining different measurements.

$$OPNew_x = CSxb - CSxa \quad (2)$$

$$OP_x = \frac{OPNew_x \cdot M_1 + OP_{x-1} \cdot M_2}{M_1 + M_2} \quad (3)$$

Here, CS$x$$a$ and CS$x$$b$ are the x-th set of sampled values for the value of the integrated signal 110 above the threshold and the value of the integrated signal 110 after injecting the offset packet, respectively. OPNew$_x$ is the x-th calculated value for the contribution of the offset packet to the integrated signal 110.

OP$_x$ is the weighted average of the previous calculated value for the contribution of the offset packet to the integrated signal 110. $M_1$ and $M_2$ are weights affecting the contribution of the current value for the offset packet and the previous averaged value. For example, $M_1$ may be 1 and $M_2$ may be 1. In another example, $M_1$ may be 1 and $M_2$ may be the number of previous values. In other embodiments, different values may be used. Moreover, in other embodiments, different techniques may be used to combine current and previous values. In addition, in some embodiments, the values may not be combined and only the current value may be used.

The offset packet may have a variety of different magnitudes. In some embodiments, the offset packet is large enough to cause the integrated signal 110 to fall below the threshold 152 given an expected largest input signal added to a level of the integrated signal just below the threshold 152. In other embodiments, the offset packet has a size that is a fraction that is less than 1 of an input signal that would cause the integrated signal to rise from zero to the threshold 152. As a result, when the offset packet is injected, the reduction in the integrated signal 110 is too small to cause the integrated signal 110 to return to zero even if the integrated signal 110 is just above the threshold 152. In other embodiments, the offset packet may have a magnitude based on a desired frequency of injections of the offset packet given an expected operation. In other embodiments, the offset packet may have different magnitudes.

Figure 4:
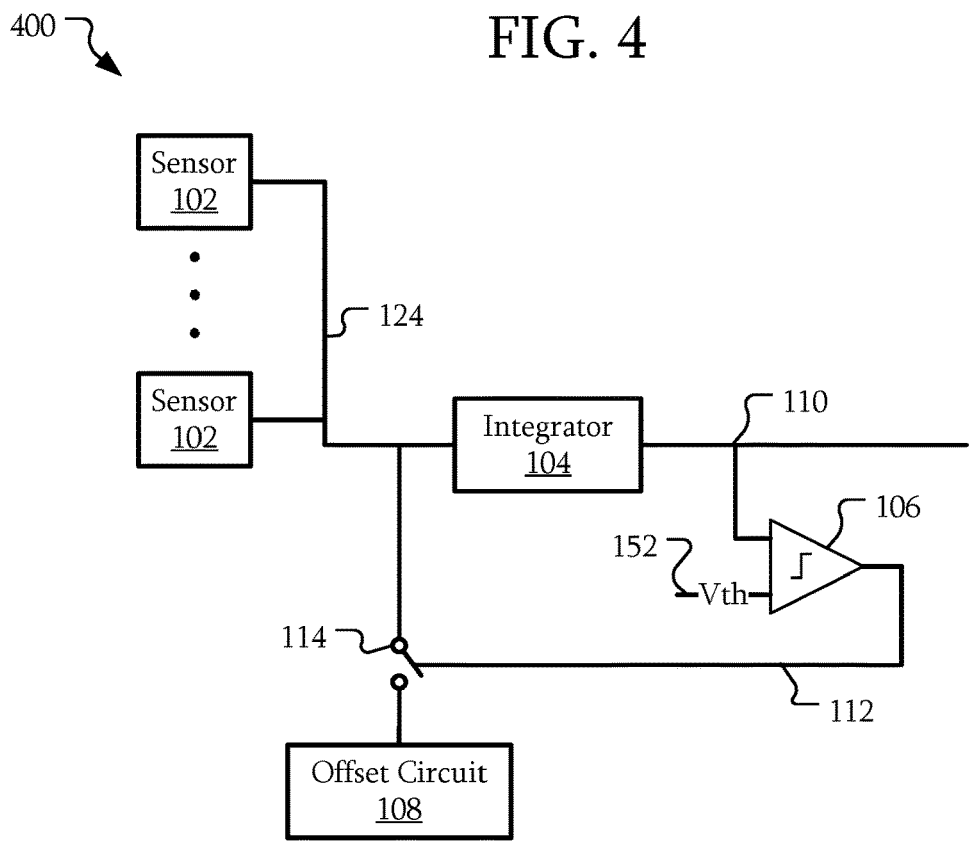
FIG. 4 is a block diagram of a detector using offset signals having multiple sensors according to some embodiments.

FIG. 4 is a block diagram of a detector using offset signals having multiple sensors according to some other embodiments. In some embodiments, the detector 400 may be similar to the detector 100 of FIG. 1. However, the detector 400 includes multiple sensors 102 coupled to a single integrator 104. For example, the sensors 102 may include switches, such as transistors, configured to selectively couple a single sensor 102 to a common line 124. The common line 124 is coupled to the integrator 104.

In some embodiments, each of the sensors 102 is coupled to the integrator 104 in sequence and a signal from that sensor 102 is integrated into the integrated signal 110. For example, referring to FIGS. 2 and 4, increase 160-1 may result from an input from a first sensor 102, increase 160-2 may result from an input from a second sensor 102, increase 160-3 may result from an input from a third sensor 102, and so on. As described above, that value may be measured by subtracting sampled values on before and after the input signal of interest.

The first sensor 102 may provide input signal 158-1 resulting in increase 160-1. Once a second sensor 102 is coupled to the integrator 104 and a signal 158-2 is integrated into the integrated signal 110, the value of the increase 160-2 may be measured. That a different sensor 102 resulted in the level of sample S2 does not affect the measurement of the input 160-2. Because sample S2 is subtracted from sample S3, the effects of the previous input are removed.

Figure 5:
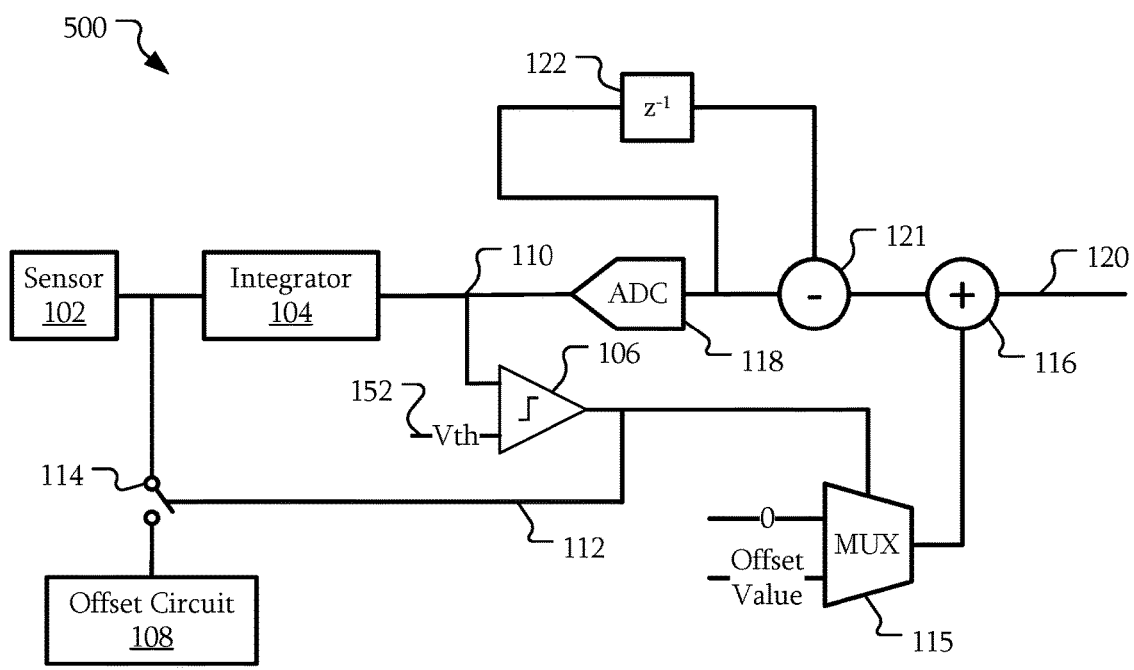
FIG. 5 is a block diagram of a detector using offset signals with digitizing and arithmetic circuits according to some embodiments.

FIG. 5 is a block diagram of a detector using offset signals with digitizing and arithmetic circuits according to some other embodiments. Detector 500 may be similar to detector 100 described above. However, detector 500 includes an ADC 118, a multiplexer 115, a delay 122, an adder 116, and a subtractor 121.

The delay 122 is configured to delay a value output from the ADC 118 to the next sample. For example, referring to FIG. 2. The value of sample S1 may be delayed such that it is input to the subtractor 121 at the same time the next sample S2 is output from the ADC 118. Thus, the subtractor 121 may subtract the value of sample S1 from the current value of sample S2.

The multiplexer 115 has two inputs, 0 and the offset value. The offset value is the digitized representation of the offset packet described above with respect to FIG. 3. When the output of the comparator 106 has passed the threshold 152, and the output signal 112 is active, the multiplexer 115 selects the offset value. Otherwise, the multiplexer 115 selects zero. Accordingly, the output of the multiplexer 115 is either 0 or the offset value depending on whether the integrated signal 110 has passed the threshold. This output is added to the difference of the most recent samples in adder 116 to generate the output value 120.

Figure 6:
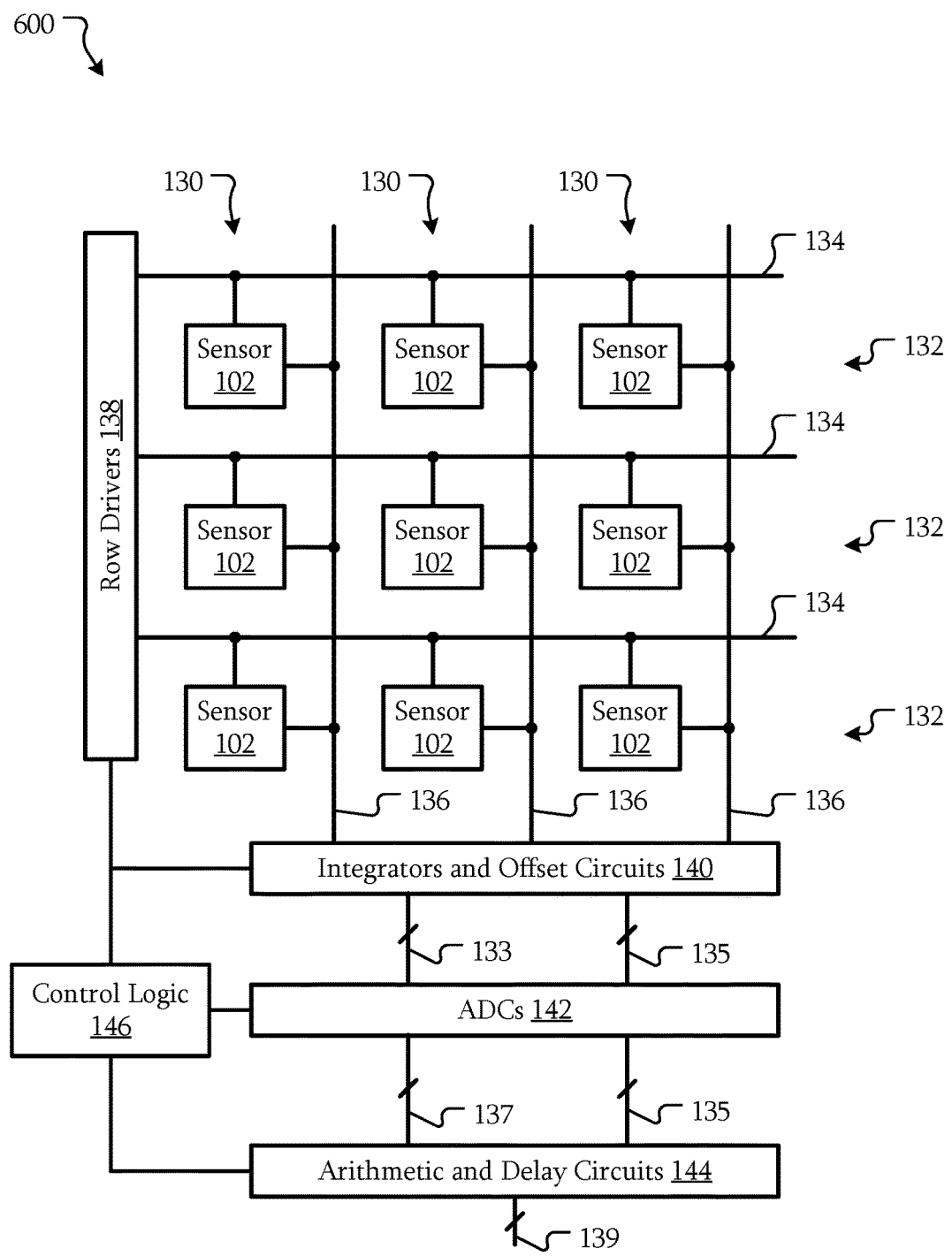
FIG. 6 is a block diagram of a 3×3 detector using offset signals according to some embodiments.

FIG. 6 is a block diagram of a 3×3 detector using offset signals according to some other embodiments. In other examples, the detector can be an m×n with m rows and n columns where at least one of m and n are integers greater than 1. The detector 600 includes multiple sensors 102 disposed in an array of rows 132 and columns 130.

The sensors 102 are coupled to a row driver 138 configured to selectively couple the sensors 102 to the column lines 136 using row select lines 134. Although row select lines 134 have been used as an example of control lines coupled between the sensors 102 and the row drivers 138, the row drivers 138 may include other control lines.

Integrator and offset circuits 140 include integrators 104 and offset circuits such as the comparator 106, offset circuit 108, and switch 114 described above. Each column 130 may be associated with its own integrator 104, comparator 106, offset circuit 108, and switch 114. The integrator and offset circuits 140 are configured to output multiple integrated signals 133 and multiple offset control signals 135.

ADCs 142 include ADCs 118 such as those described in FIG. 5. Each column 130 may be coupled with a different ADC 118. The ADCs 142 are configured to generate digitized signals 137 for each column 130. The offset control signals 135 may pass through or bypass the ADCs 142.

The arithmetic and delay circuits 144 are circuits configured to combine the digitized signals 137 and offset control signals 135 as described above. For example, each column may be associated with a separate adder 116, subtractor 121, and delay 122 as described above in FIG. 5. The arithmetic and delay circuits 144 are configured to output digitized signals 139 such as the output signal 120 of FIG. 5.

In some embodiments, after each row 132 is read, the various circuits described above may output a set of digitized signals 139 representing that row 132. However, in other embodiments, the detector 600 may operate on frames. For example, one frame of data may be captured from the detector 600. The data may include results of the integration after receiving signals from each row 132 of the detector 600. In addition, the data may include the output of the comparator along with the digitized integrated signal 110. This frame of data may be combined with data from the last row of the previous frame of data or an initialized set of data representing the state of the integrated signals 110 before the first row 132 is read. Each row of the frame of data may be subtracted from the next row 132 and combined with the corresponding output of the comparators.

In some embodiments, the detector 600 includes control logic 146. The control logic 146 may be coupled to the row drivers 138, integrator and offset circuits 140, ADCs 142, and arithmetic and delay circuits 144. The control logic 146 may include a general purpose processor, a digital signal processor (DSP), an application specific integrated circuit, a microcontroller, a programmable logic device, discrete circuits, a combination of such devices, or the like. The control logic 146 may be configured to control operations of the detector 600, such as the sampling of particular rows 132, calibrations as described above with respect to FIG. 3, or the like.

The control logic 146 may be configured to supply an offset value to the arithmetic and delay circuits 144 such that the offset value may be added as described herein. In some embodiments, the offset value that is added in the arithmetic and delay circuits 144 may be different for different columns 130. As described above, each column 130 may be associated with a different integrator 104, offset circuit 108, ADC 118, the like. Variations in those circuits may cause variations in the digitized measurement of the offset packet.

Referring to FIG. 1, in some embodiments, the integrated signal 110 and/or the integrator 104 is not reset. That is, the integrated signal 110 is continuously integrated. Once the integrated signal passes the threshold 152, the integrated signal 110 is reduced by the offset packet. However, in other embodiments, the integrated signal 110 and/or the integrator 104 may be reset. For example, referring to FIG. 6, when a new frame of data is about to be acquired, the integrators 104 of the integrators and offset circuits 140 may be reset. The values of the reset integrated signal 110 may be sampled to acquire an initial row of data to be subtracted from the first row 132 of actual data that is sampled. Although a zero sample is acquired, that zero sample is one for multiple rows 132 rather than one for each row 132. As a result, the additional overhead of one sample period is spread over multiple sample periods of a frame rather than a single sample period. Thus, the effect on overall sampling time is reduced. Moreover, while resetting the integrators 104 may introduce some noise, that noise is not introduced for every sampled row.

Figure 7:
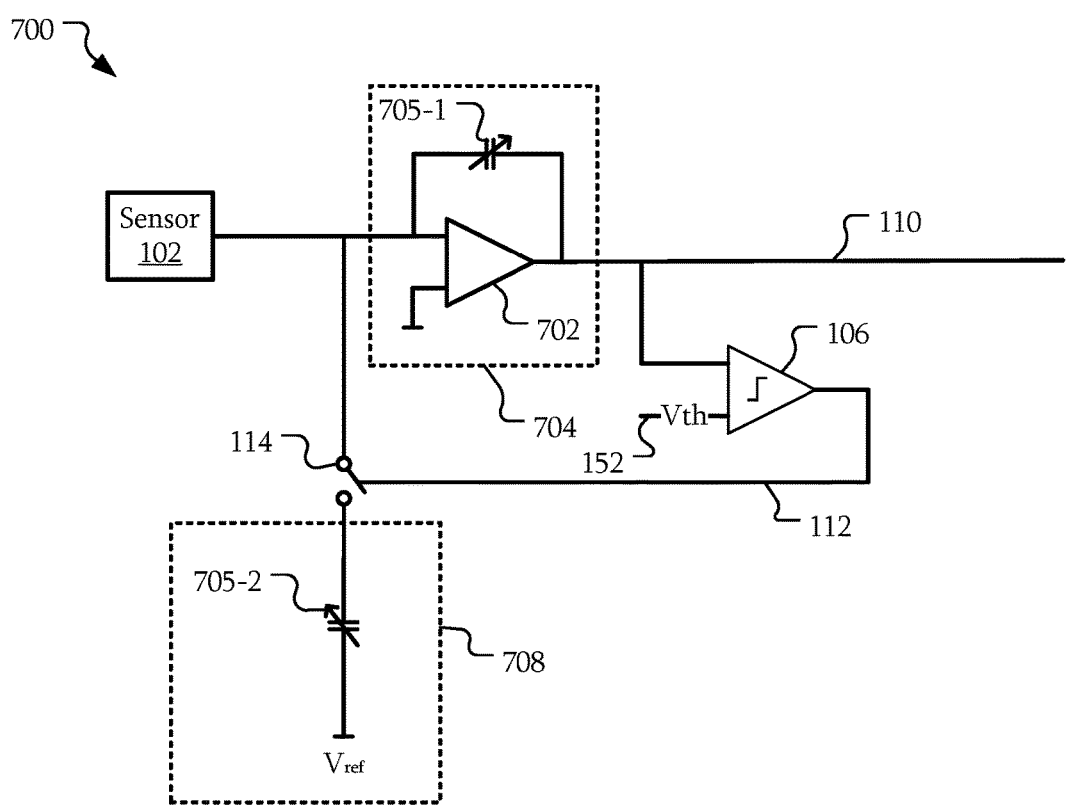
FIG. 7 is a block diagram of a detector using offset signals according to some other embodiments.

FIG. 7 is a block diagram of a detector using offset signals according to some other embodiments. The detector 700 may be similar to the detector 100 described above. The detector 700 includes a sensor 102 similar to the sensors 102 described above. In addition, the detector 700 includes an amplifier 702 and a capacitor 705-1. The amplifier 702 and capacitor 705-1 are coupled to form an integrator 704. Here, the capacitor 705-1 is illustrated as a variable capacitor; however, in other embodiments, the capacitor 705-1 may be a fixed capacitor.

An offset circuit 708 is formed by capacitor 705-2 and reference voltage $V_{ref}$. The size of the offset packet may be determined by selecting the size of the capacitor 705-2 and the magnitude of the reference voltage $V_{ref}$.

As described above, the offset packet from an offset circuit 708 may be measured to determine an offset value. In some embodiments, during operation, the value of the capacitor 705-1 may be changed. Accordingly, the offset value representing the injection of the offset packet may be remeasured. In particular, any averaging or other combination with previous measurements of the offset value may be discarded. Similarly, if the capacitor 705-2 is changed, the offset packet may be remeasured. Regardless, the change in the integrated signal 110 due to the offset packet may be remeasured to accommodate the change in conditions.

Figure 8:
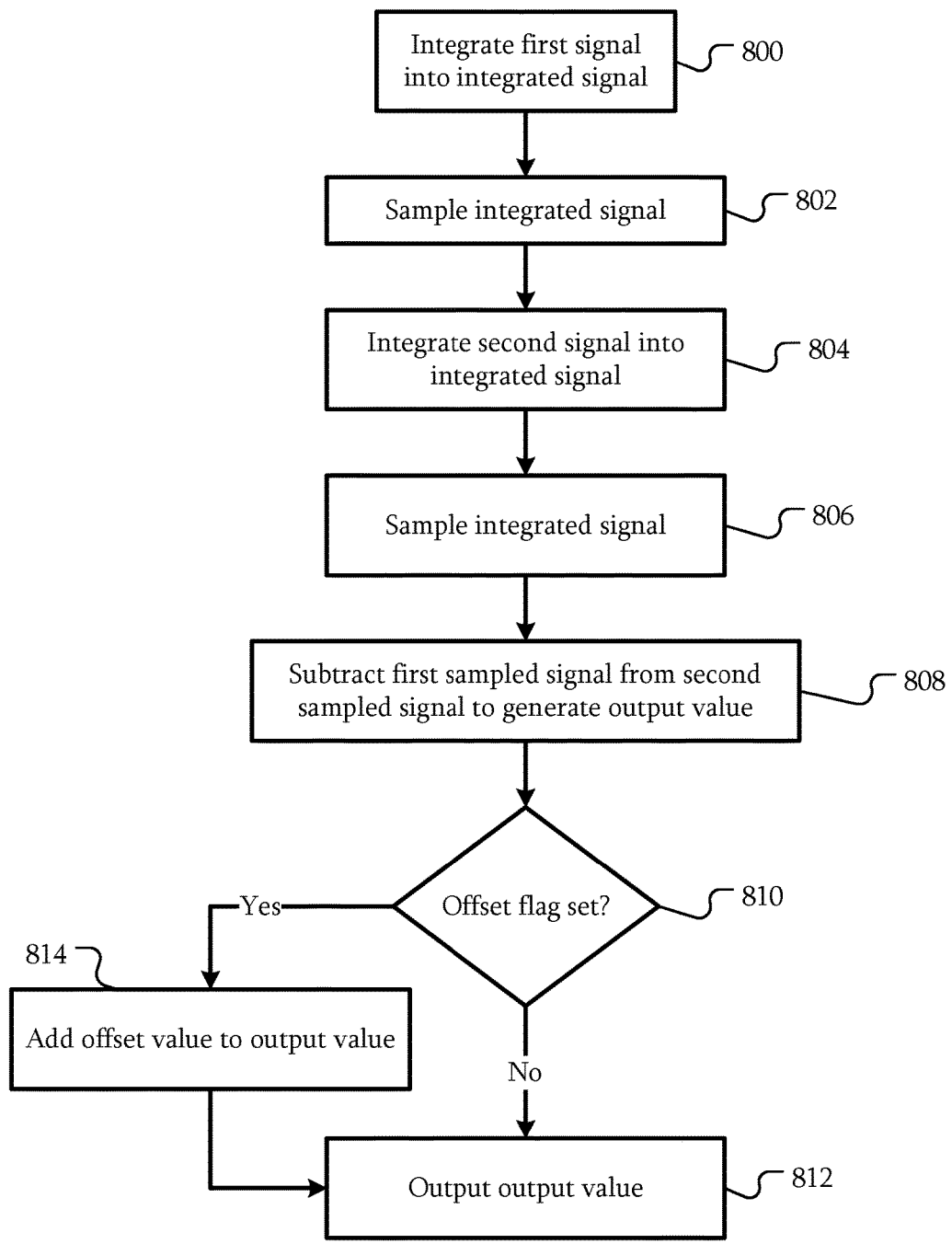
FIG. 8 is a flowchart illustrating a technique of operating an integrator according to some embodiments.

FIG. 8 is a flowchart illustrating a technique of operating an integrator according to some embodiments. In 800, a first signal is integrated into an integrated signal. For example, a signal from a sensor 102 may be integrated in an integrator 104 into integrated signal 110. In 802, the integrated signal is sampled to generate a first sampled signal. For example, an ADC 118 may be used to digitize the integrated signal 110.

In 804, a second signal is integrated into the integrated signal. For example, another signal from the sensor 102 or another sensor 102 may be integrated in the integrator 104. In 806, the integrated signal may be sampled again to generate a second sampled signal. For example, the ADC 118 may be used to digitize the integrated signal 110 again.

In 808, the first sampled signal is subtracted from the second sampled signal to generate an output value. For example, a delay 122 may be used to delay the first sampled signal one sample period. The delayed signal may then be subtracted from a current sample from the ADC 118. In other examples, a previous row of a frame may be used as the source of the first sampled signal.

In 810, an offset flag is checked to determine if it is set. For example, the output signal 112 from a comparator 106 may be used as the offset flag. If the flag is not set, then the integrated signal at the time of the sampling in 806 did not pass the threshold. As a result, the output signal is output in 812. In particular, the output signal is output without adding in an offset value.

However, if the offset flag is set, then the offset packet was injected into the integrator. As a result, the integrated signal was lowered by the offset packet before being sampled in 806. Accordingly, the offset value is added to the output signal in 814. The output signal may then be output in 812.

Figure 9:
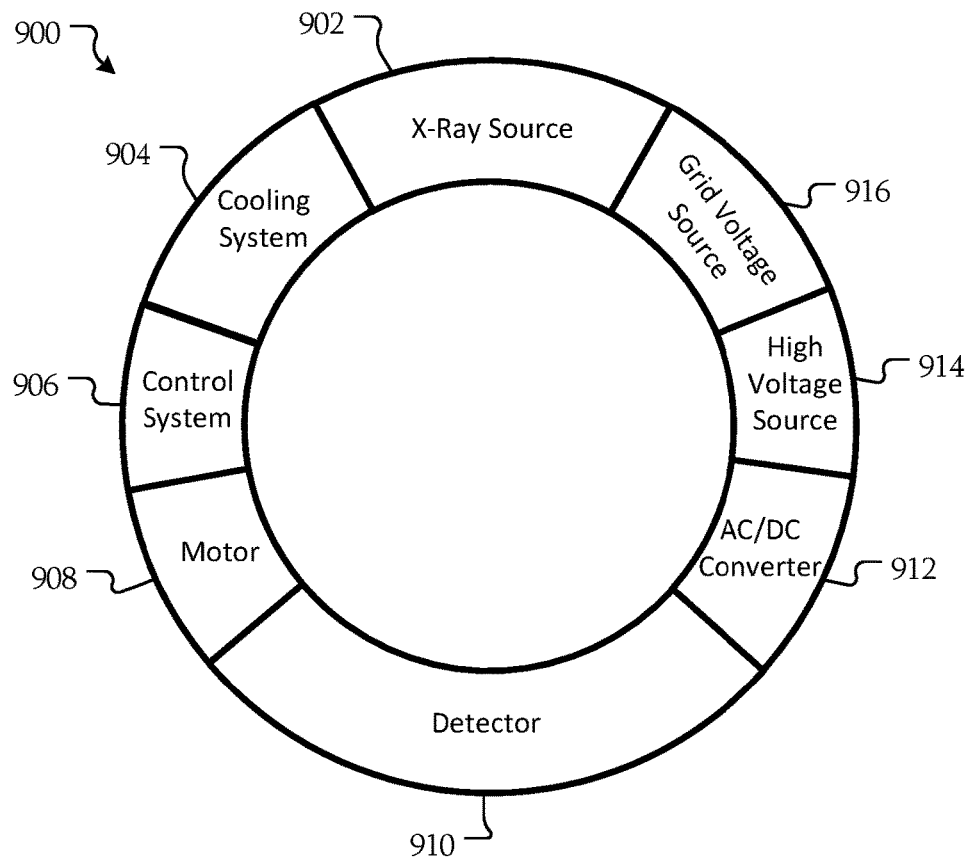
FIG. 9 is a block diagram of a computerized tomography (CT) gantry according to some embodiments.

FIG. 9 is a block diagram of a computerized tomography (CT) gantry according to some embodiments. In some embodiments, the CT gantry includes an x-ray source 902, a cooling system 904, a control system 906, a motor drive 908, a detector 910, an AC/DC converter 912, a high voltage source 914, and a grid voltage source 916. The detector 910 may include a detector, a thinned substrate, or the like as described above. Although particular components have been used as examples of components that may be mounted on a CT gantry, in other embodiments, the other components may be different. Although a CT gantry is used as an example of a system that includes a detector as described herein, detectors described herein may be used in other types of systems.

Figure 10:
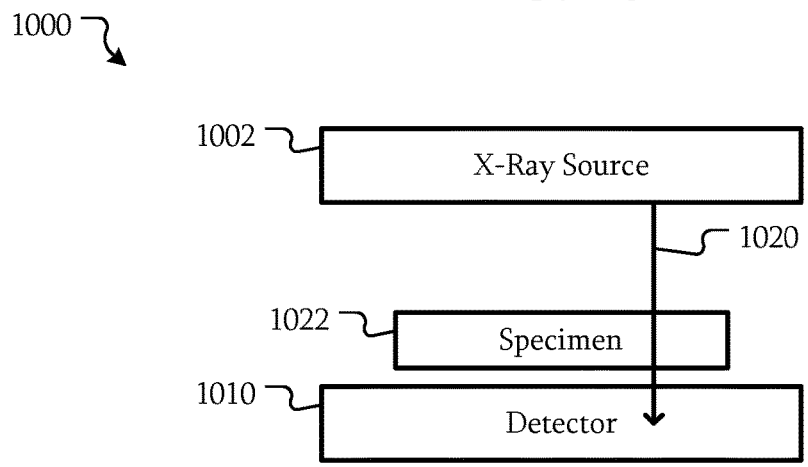
FIG. 10 is a block diagram of a 2D x-ray imaging system according to some embodiments.

FIG. 10 is a block diagram of a 2D x-ray imaging system according to some embodiments. The imaging system 1000 includes an x-ray source 1002 and a detector 1010. The detector 1010 may include a detector, a thinned substrate, or the like as described above. The x-ray source 1002 is disposed relative to the detector 1010 such that x-rays 1020 may be generated to pass through a specimen 1022 and detected by the detector 1010.

Some embodiments include a computer readable medium storing instructions that, when executed, cause the computer to perform one or more of the operations described above. For example, such instructions may include instructions for operating a detector.

Referring to FIGS. 1-8, some embodiments include a method, comprising: integrating an input signal using an integrator 104 to generate an integrated signal 110; comparing the integrated signal 110 to a threshold 152; and injecting an offset signal into the integrator 104 in response to comparing the integrated signal 110 to the threshold 152 such that the integrated signal 110 passes the threshold 152.

Some embodiments include measuring a first sample of the integrated signal 110; measuring a second sample of the integrated signal 110 immediately after measuring the first sample; and subtracting the first sample from the second sample to generate an output value.

Some embodiments include, if the offset signal was injected into the integrator 104, adding an offset sample to the output value.

Some embodiments include resetting the integrator 104 such that the integrated signal 110 is greater than the threshold 152; measuring a first calibration sample of the integrated signal 110 after resetting the integrator 104; injecting the offset signal into the integrator 104; measuring a second calibration sample of the integrated signal 110 after injecting the offset signal into the integrator 104; subtracting the first calibration sample from the second calibration sample to generate a third calibration sample; and calculating the offset sample in response to the third calibration sample.

In some embodiments, measuring the second sample comprises measuring the second sample without resetting the integrator 104.

In some embodiments, injecting the offset signal into the integrator 104 comprises injecting the offset signal into the integrator 104 while integrating the input signal.

In some embodiments, the first sample is measured after integrating the input signal from a first sensor; and the second sample is measured after integrating the input signal from a second sensor different from the first sensor. A computer readable medium having instructions stored thereon adapted to perform Some embodiments include a system, comprising: an integrator 104 having configured to integrate an input signal into an integrated signal 110; a comparator 106 coupled to the integrator 104 and configured to compare the integrated signal 110 with a threshold 152; and an offset circuit 108 coupled to the integrator 104 and configured to apply an offset signal to the integrator 104 in response to the comparator 106.

Some embodiments include a sensor coupled to the integrator 104 and configured to generate the input signal.

Some embodiments include a control logic 146 configured to generate an output value based on a first value read from the integrator 104, a second value read from the integrator 104, and an output of the comparator 106.

In some embodiments, the control logic 146 is configured to generate the output value without resetting the integrator 104.

In some embodiments, the control logic 146 is configured to generate the output value by subtracting an offset value.

In some embodiments, the control logic 146 is configured to: reset the integrator 104 such that the integrated signal 110 is greater than the threshold 152; measure a first calibration sample of the integrated signal 110 after resetting the integrator 104; cause the offset circuit 108 to inject the offset signal into the integrator 104; measure a second calibration sample of the integrated signal 110 after the offset circuit 108 injects the offset signal into the integrator 104; subtract the first calibration sample from the second calibration sample to generate a third calibration sample; and calculate the offset value in response to the third calibration sample.

Some embodiments a plurality of sensors 102; a selection circuit configured to selectively couple a selected sensor of the sensors 102 to the integrator 104; wherein the control logic 146 is configured to: cause a first one of the sensors 102 to be coupled to the integrator 104 to generate the first value; and cause a second one of the sensors 102 different from the first one to be coupled to the integrator 104 to generate the second value.

In some embodiments, the integrator 104 is a first integrator 104, the comparator 106 is a first comparator 106, the offset circuit 108 is a first offset circuit 108; the system further comprises: a second integrator 104 having configured to integrate second input signal into a second integrated signal 110; a second comparator 106 coupled to the second integrator 104 and configured to the second integrated signal 110 with a second threshold 152; and a second offset circuit 108 coupled to the second integrator 104 and configured to apply a second offset signal to the second integrator 104 in response to the second comparator 106; and a plurality of pixels disposed in an array of rows and columns; and pixels of a first column of the pixels are coupled to the first integrator 104 and pixels of a second column different from the first column are coupled to the second integrator 104.

Some embodiments include means for integrating an input signal to generate an integrated signal. Examples of the means for integrating include the integrator 104.

Some embodiments include means for comparing the integrated signal to a threshold. Examples of the means for comparing include the comparator 106 and/or the control logic 146.

Some embodiments include means for injecting an offset signal into the integrated signal in response to the means for comparing such that the integrated signal passes the threshold. Examples of the means for injecting include the offset circuit 108 and the switch 114.

Some embodiments include means for measuring a first sample of the integrated signal. Examples of the means for measuring include the ADC 118.

Some embodiments include means for measuring a second sample of the integrated signal immediately after measuring the first sample. Examples of the means for measuring include the ADC 118.

Some embodiments include means for subtracting the first sample from the second sample to generate an output value. Examples of the means for subtracting include the subtractor 121 and the control logic 146.

Some embodiments include means for adding an offset value to the output value if the offset signal was injected into the integrated signal. Examples of the means for adding include the adder 116 and the control logic 146.

Some embodiments include means for resetting the integrated signal such that the integrated signal is greater than the threshold. Examples of the means for resetting include portions of the integrator 104, reset circuitry described above, and the control logic 146.

Some embodiments include means for measuring a first calibration sample of the integrated signal after resetting the integrated signal. Examples of the means for measuring include the ADC 118.

Some embodiments include means for injecting the offset signal into the integrated signal. Examples of the means for injecting include the offset circuit 108 and the switch 114.

Some embodiments include means for measuring a second calibration sample of the integrated signal after injecting the offset signal into the integrated signal. Examples of the means for measuring include the ADC 118.

Some embodiments include means for subtracting the first calibration sample from the second calibration sample to generate a third calibration sample. Examples of the means for subtracting include the control logic 146.

Some embodiments include means for calculating the offset value in response to the third calibration sample. Examples of the means for calculating include the control logic 146.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112 ¶6. Embodiments of the invention in which an exclusive property or privilege is claimed are defined as follows.

The invention claimed is:

1. A method, comprising:
    integrating an input signal using an integrator to generate an integrated signal;
    comparing the integrated signal to a threshold; and
    injecting an offset signal into the integrator in response to comparing the integrated signal to the threshold such that the integrated signal passes the threshold.

2. The method of claim 1, further comprising:
    measuring a first sample of the integrated signal;
    measuring a second sample of the integrated signal immediately after measuring the first sample; and
    subtracting the first sample from the second sample to generate an output value.

3. The method of claim 2, further comprising if the offset signal was injected into the integrator, adding an offset sample to the output value.

4. The method of claim 3, further comprising:
    resetting the integrator such that the integrated signal is greater than the threshold;
    measuring a first calibration sample of the integrated signal after resetting the integrator;
    injecting the offset signal into the integrator;
    measuring a second calibration sample of the integrated signal after injecting the offset signal into the integrator;
    subtracting the first calibration sample from the second calibration sample to generate a third calibration sample; and
    calculating the offset sample in response to the third calibration sample.

5. The method of claim 2, wherein measuring the second sample comprises measuring the second sample without resetting the integrator.

6. The method of claim 2, wherein injecting the offset signal into the integrator comprises injecting the offset signal into the integrator while integrating the input signal.

7. The method of claim 2, wherein:
the first sample is measured after integrating the input signal from a first sensor; and
the second sample is measured after integrating the input signal from a second sensor different from the first sensor.

8. A non-transitory computer readable medium having instructions stored thereon adapted to perform the method of claim 1.

9. A system, comprising:
an integrator configured to integrate an input signal into an integrated signal;
a comparator coupled to the integrator and configured to compare the integrated signal with a threshold; and
an offset circuit coupled to the integrator and configured to apply an offset signal to the integrator in response to the comparator.

10. The system of claim 9, further comprising a sensor coupled to the integrator and configured to generate the input signal.

11. The system of claim 9, further comprising a control logic configured to generate an output value based on a first value read from the integrator, a second value read from the integrator, and an output of the comparator.

12. The system of claim 11, wherein the control logic is configured to generate the output value without resetting the integrator.

13. The system of claim 11, wherein the control logic is configured to generate the output value by adding an offset value based on the output of the comparator.

14. The system of claim 13, wherein the control logic is configured to:
reset the integrator such that the integrated signal is greater than the threshold;
measure a first calibration sample of the integrated signal after resetting the integrator;
cause the offset circuit to inject the offset signal into the integrator;
measure a second calibration sample of the integrated signal after the offset circuit injects the offset signal into the integrator;
subtract the first calibration sample from the second calibration sample to generate a third calibration sample; and
calculate the offset value in response to the third calibration sample.

15. The system of claim 11, further comprising:
a plurality of sensors;
a selection circuit configured to selectively couple a selected sensor of the sensors to the integrator;
wherein the control logic is configured to:
cause a first one of the sensors to be coupled to the integrator to generate the first value; and
cause a second one of the sensors different from the first one to be coupled to the integrator to generate the second value.

16. The system of claim 9, wherein:
the integrator is a first integrator, the comparator is a first comparator, the offset circuit is a first offset circuit;
the system further comprises:
a second integrator having configured to integrate second input signal into a second integrated signal;
a second comparator coupled to the second integrator and configured to the second integrated signal with a second threshold; and
a second offset circuit coupled to the second integrator and configured to apply a second offset signal to the second integrator in response to the second comparator; and
a plurality of pixels disposed in an array of rows and columns; and
pixels of a first column of the pixels are coupled to the first integrator and pixels of a second column different from the first column are coupled to the second integrator.

17. A system, comprising:
means for integrating an input signal to generate an integrated signal;
means for comparing the integrated signal to a threshold; and
means for injecting an offset signal into the integrated signal in response to the means for comparing such that the integrated signal passes the threshold.

18. The system of claim 17, further comprising:
means for measuring a first sample of the integrated signal;
means for measuring a second sample of the integrated signal immediately after measuring the first sample; and
means for subtracting the first sample from the second sample to generate an output value.

19. The system of claim 18, further comprising means for adding an offset value to the output value if the offset signal was injected into the integrated signal.

20. The system of claim 19, further comprising:
means for resetting the integrated signal such that the integrated signal is greater than the threshold;
means for measuring a first calibration sample of the integrated signal after resetting the integrated signal;
means for injecting the offset signal into the integrated signal;
means for measuring a second calibration sample of the integrated signal after injecting the offset signal into the integrated signal;
means for subtracting the first calibration sample from the second calibration sample to generate a third calibration sample; and
means for calculating the offset value in response to the third calibration sample.

* * * * *